Jan. 20, 1925.  
P. S. EASTERDAY  
MACHINE FOR MOLDING PLASTIC MATERIAL  
Filed April 4, 1922 2 Sheets-Sheet 2
1,523,936
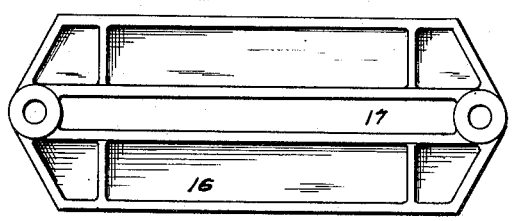
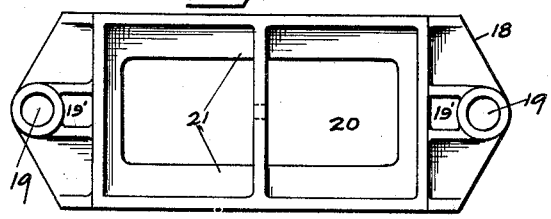
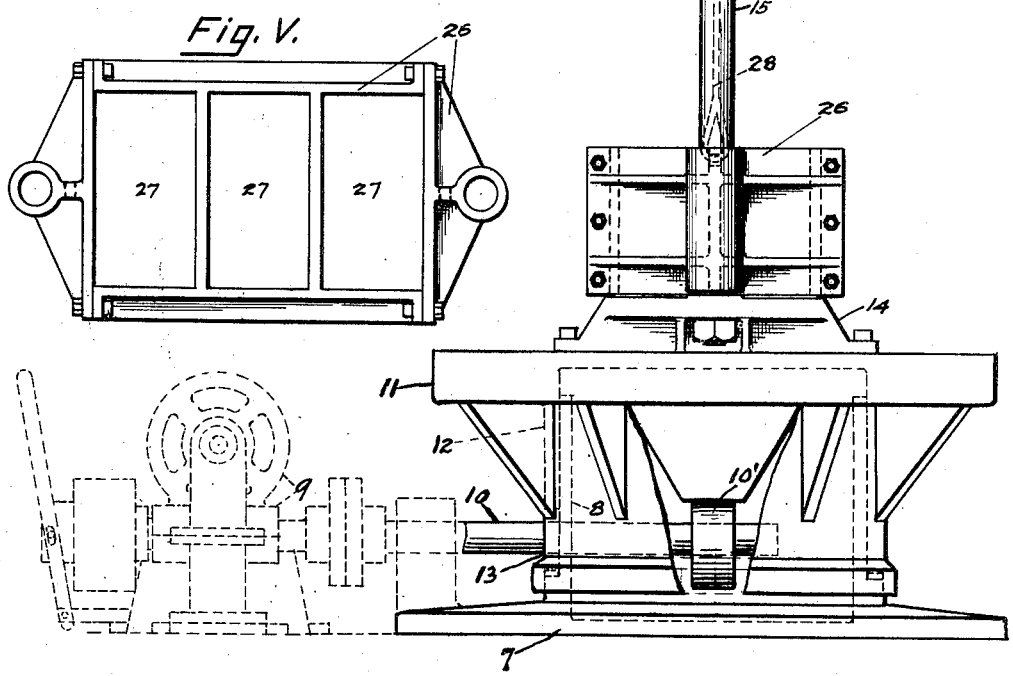
INVENTOR:  
PHILIP S. EASTERDAY.  
BY R. C. Wright  
ATT'Y.

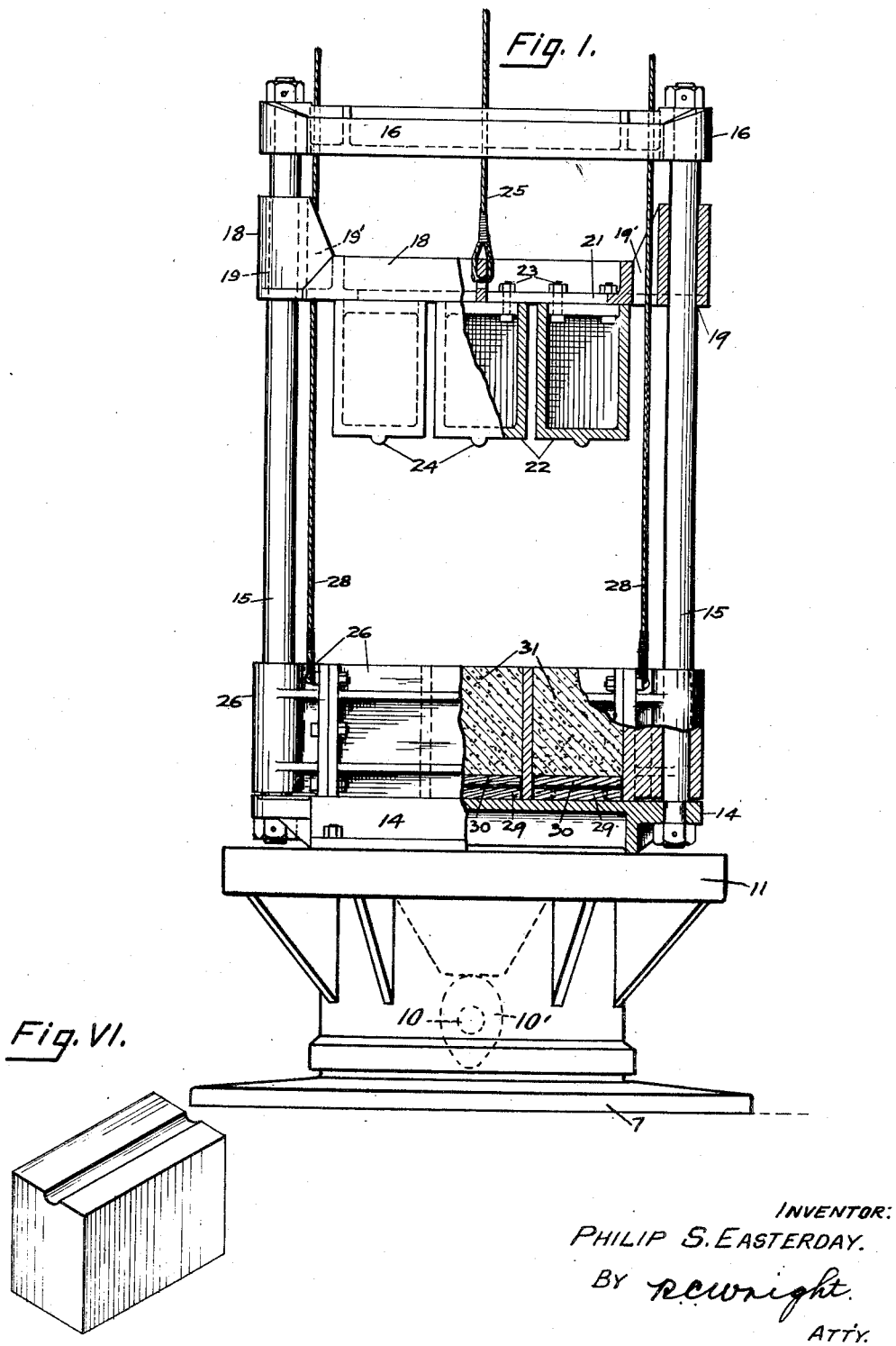

Patented Jan. 20, 1925.

1,523,936

UNITED STATES PATENT OFFICE.

PHILIP S. EASTERDAY, OF PORTLAND, OREGON, ASSIGNOR TO TUERCK MacKENZIE COMPANY, A CORPORATION OF OREGON.

MACHINE FOR MOLDING PLASTIC MATERIAL.

Application filed April 4, 1922. Serial No. 549,639.

*To all whom it may concern:*

Be it known that I, PHILIP S. EASTERDAY, a citizen of the United States, residing at Portland, in the county of Multnomah and State of Oregon, have invented a new and useful Improvement in Machines for Molding Plastic Material, of which the following is a specification, reference being had to the accompanying drawings.

My invention relates to machines adapted for forming or molding plastic material into desired shapes, as a class.

The object of my invention is to provide a machine of this class wherein mechanisms are arranged to receive plastic material within molds positioned upon a carrying base actuated to produce a vertical jarring motion and to impart the vibrations of this movement to the plastic material. Also other mechanism arranged to allow weights to be lowered upon the plastic material within the molds and the weights to rest thereon during said jarring movement. These objects, as well as other advantages, I attain by the construction, combination and arrangement of parts illustrated in the accompanying drawings which form a part hereof.

Fig. I is a front elevation of the device with parts broken away.

Fig. II is a side elevation of the device.

Fig. III is a plan view of upper horizontal frame plate.

Fig. IV is a plan view of the sliding plate for carrying weights thereon.

Fig. V is a plan view of the sliding mold box.

Fig. VI is a perspective view of an example of block as molded by the form of mechanism illustrated.

Like characters refer to like parts in the views.

The jarring machine consists of a base 7, provided with a vertical, hollow pedestal 8. An engine or motor 9 develops power which is transmitted by the shaft 10 to any suitable mechanism 10' within the pedestal adapted to lift the table 11. The table 11 has a hollow base 12 which surrounds and is vertically slidable over the pedestal 8. A slot 13 in the base 12 allows the base to move vertically with the shaft 10 in place.

The jarring mechanism is shown in dotted lines in Figs. I and II, and is of a common type intended to jar objects resting upon the table 11.

Upon the table 11 I have rigidly secured a vertical rectangular frame in a base 14, which in turn is secured to the table 11. The frame consists of vertical guide rods 15, having their lower ends secured in opposite sides of the base 14. A plate 16 extends between the upper ends of the rods 15, and said ends are rigidly secured in the opposing ends of the plate 16. A slot 17 extends longitudinally along the center of the plate 16. A weight holding plate 18 is provided. It has openings 19 on each end, through which the opposing rods 15 pass, making the plate slidable on the rods. The plate also has openings 19' near each end adjacent to the openings 19. The plate 18 also has a longitudinal opening 20, with supporting shelves 21 about the same. Pendent, hollow, weight boxes 22 are suspended from the plate 18, secured by bolts 23 attached to the boxes and shelves 21. The bottoms of the weight boxes may be formed with or without molding forms. In the example shown, a rib 24 extends along the bottom, and molds a groove such as observed in the upper surface of the block in Fig. VI. The desired weight is obtained by placing objects in the weight boxes to produce the same. The plate 18 is held in suspended position by means of a cable 25, the lower end of which is secured to the center of the plate, the opposing end extending to a suitable drawing means. A mold box 26 is slidably arranged on the rods 15 below the weight carrying plate 18. The mold box has a series of vertical mold forms 27 extending through it. Lift cables 28 are secured at their lower ends to opposing ends of the mold box, the cables extending therefrom upwardly through the openings 19' in the plate 18 and slot 17 of the plate 16 to a source of draft power. A series of false bottoms 29 are secured upon the base 14, over which the opposing mold forms 27 are received. Pallets 30 are placed upon the bottoms 29, and into the mold forms 27, plastic material 31 may be deposited in any convenient manner. The weights are of a shape adapting them to be dropped into the opposing forms 27 below and occupy the space laterally.

The operation of the device will now be described. The weights having been drawn to the elevated position as shown in Fig. I and pallets placed within the forms 27 and plastic material upon the pallets as illustrated in the same figure, the machine is then charged and ready for operation. The weights are lowered upon the material in the forms and the jarring machine 9 is started. This causes the table 11 to rise a pre-determined distance and allows it then to drop with a jolt upon the pedestal 8. At the same time the weights are carried upon the surface of the material and the jarring or jolting movement is transmitted to them, causing them to indent the form 24 into the upper surface of the material, also to tamp it at the same time solidly within the forms 27. When the material has attained the density desired, the jarring machine is stopped and the means for drawing the cables 28 is started, together with means for winding the cable 25 upwardly. This causes the mold box 26 to rise, engage the weight carrier 18 and lift it to the position shown in Fig. I, at the same time leaving the molded material 31 resting free upon the pallets 30, which are then removed to allow the material to cure. The mold box is then lowered to the position shown in Fig. I, and the said operation is repeated with rapidity, thus allowing the production of molded material in great quantity and in fast time.

In the arrangement of these mechanisms there is an adjustment thereof to allow a drop of the table 11 which will attain a jarring movement of pre-determined force, also an amount of weight on the plate 18, pre-determined in relation to the jarring motion and the quality and quantity of the plastic material to be molded. That is to say, a relation of this kind must be first determined and preserved with respect to a large thick block or a flatter tile form or the material for example. Likewise, if the material is to be made of differing density, the relation referred to must be governed in accordance with the resultant product desired. It will be further observed that my device provides a means of giving a jarring action to the mold table, the lifting apparatus being substantially in the vertical axis of the machine, together with guide means exterior to and concentric about and below the point of application of said jarring impact, to guide and stabilize the point of application of the power.

I claim—

1. In a machine of the class described, the combination of a mold-table supported for vertical jogging movements, means whereby a jogging motion is given to said table, a rigid frame secured to said table, a mold-box slidable vertically in said frame including a mold, a plate slidable vertically in said frame and formed with an aperture, a hollow plunger adapted to enter said mold and secured to the under side of said plate and having an opening registering with the aperture in said plate.

2. In a machine of the class described, a mold-table supported for vertical jogging movements, means whereby a jogging motion is given to said table, a rectangular frame secured to said table consisting in a base, vertical guide-rods secured at their lower ends in said base, a plate rigidly connecting the upper ends of said rods, a plate slidable on said guide-rods, a mold-box slidable on said guide rods and supported on said base, a plunger secured to said slidable plate and disposed to enter said mold-box, and cables extending between said guide-rods and connected to said slidable plate and said mold-box whereby the said plate and box may be actuated.

3. In a machine of the class described, a mold-table supported for vertical jogging movements, means whereby a jogging motion may be given to said table, vertical guide-rods secured at their lower ends in said base, a plate rigidly connecting the upper ends of said rods having a longitudinal slot therein, a plate slidable on said guide-rods formed with a plurality of openings therein, a mold-box slidable on said guide-rods and supported on said base, a hollow plunger secured to said slidable plate and disposed to enter said mold-box, said plunger having an aperture in its upper wall registering with an opening of said slidable plate, cables extending between said guide-rods and through the opening in said plates whereby said mold-box may be lifted, and a cable connected intermediate said slidable plate extending through said slot in said upper plate.

PHILIP S. EASTERDAY.

Witnesses:
C. H. BULLEN,
C. W. THOMPSON.